(12) United States Patent
Lee

(10) Patent No.: US 9,910,684 B2
(45) Date of Patent: Mar. 6, 2018

(54) EXTENSIBLE FIRMWARE ABSTRACTION

(71) Applicant: Hewlett-Packard Development Company, L.P., Houston, TX (US)

(72) Inventor: Terry Ping-Chung Lee, Antelope, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 137 days.

(21) Appl. No.: 14/779,969

(22) PCT Filed: Mar. 25, 2013

(86) PCT No.: PCT/US2013/033656
§ 371 (c)(1),
(2) Date: Sep. 24, 2015

(87) PCT Pub. No.: WO2014/158128
PCT Pub. Date: Oct. 2, 2014

(65) Prior Publication Data
US 2016/0154657 A1  Jun. 2, 2016

(51) Int. Cl.
*G06F 9/44* (2006.01)
*G06F 9/445* (2006.01)

(52) U.S. Cl.
CPC ............ *G06F 9/44521* (2013.01); *G06F 8/54* (2013.01); *G06F 9/44536* (2013.01)

(58) Field of Classification Search
CPC ..... G06F 9/44521; G06F 8/54; G06F 9/44536
USPC ........................................ 717/162, 163, 164
See application file for complete search history.

(56) References Cited

U.S. PATENT DOCUMENTS

| | | | | |
|---|---|---|---|---|
| 5,487,134 A | * | 1/1996 | Ballard | G06F 17/5045 706/46 |
| 5,953,520 A | * | 9/1999 | Mallick | G06F 9/45504 703/26 |
| 6,117,180 A | * | 9/2000 | Dave | G06F 9/4887 703/2 |
| 6,493,816 B1 | * | 12/2002 | Munroe | G06F 9/465 707/999.102 |
| 6,701,518 B1 | * | 3/2004 | Dwyer | G06F 8/52 714/E11.209 |
| 6,834,391 B2 | | 12/2004 | Czajkowski et al. | |
| 6,848,088 B1 | * | 1/2005 | Levitt | G06F 17/504 703/2 |

(Continued)

FOREIGN PATENT DOCUMENTS

TW          201027432 A       7/2010

OTHER PUBLICATIONS

INF—Spec, "EDK II INF File Specification", May 2010, Intel, Rev 1.22.*

(Continued)

*Primary Examiner* — Hossain Morshed
(74) *Attorney, Agent, or Firm* — Fabian VanCott

(57) ABSTRACT

A method for extensible firmware abstraction includes creating a null library and adding null library dependencies to the null library's build file. The null library is associated with a shared firmware module that depends on the null library dependencies for successful execution. A computer processor executes the build file, null library, and shared firmware module to impose the null library dependencies on execution of the shared firmware module.

17 Claims, 3 Drawing Sheets

(56) References Cited

U.S. PATENT DOCUMENTS

| | | | | |
|---|---|---|---|---|
| 6,883,166 | B1* | 4/2005 | Thompson | G06F 8/447 714/E11.209 |
| 7,007,159 | B2 | 2/2006 | Wyatt | |
| 7,139,841 | B1* | 11/2006 | Somasundaram | H04L 29/1233 370/392 |
| 7,322,026 | B2* | 1/2008 | Ahluwalia | G06F 11/3672 714/E11.207 |
| 7,426,705 | B1* | 9/2008 | Kolaric | G06F 17/5045 716/128 |
| 7,444,648 | B2 | 10/2008 | Bracha et al. | |
| 8,332,632 | B2 | 12/2012 | Iftode et al. | |
| 8,839,399 | B2* | 9/2014 | Jain | G06F 21/78 711/147 |
| 2004/0117771 | A1* | 6/2004 | Venkatapathy | G06F 11/3624 717/130 |
| 2004/0128584 | A1* | 7/2004 | Mandava | G06F 11/3676 714/38.14 |
| 2004/0268109 | A1* | 12/2004 | Rothman | G06F 9/4401 713/1 |
| 2005/0055605 | A1* | 3/2005 | Blumenthal | G06F 11/362 714/13 |
| 2005/0204345 | A1* | 9/2005 | Rivera | G06F 11/3624 717/127 |
| 2005/0210222 | A1* | 9/2005 | Liu | G06F 11/3608 712/220 |
| 2005/0251652 | A1* | 11/2005 | Nallusamy | G06F 9/45504 712/209 |
| 2006/0020780 | A1* | 1/2006 | Hobson | G06F 9/4401 713/2 |
| 2006/0031807 | A1* | 2/2006 | Abramovici | G01R 31/31853 716/106 |
| 2006/0047941 | A1* | 3/2006 | Lai | G06F 9/4403 713/2 |
| 2006/0070053 | A1* | 3/2006 | Andersen | G06F 8/54 717/163 |
| 2006/0075304 | A1* | 4/2006 | Canning | G06F 11/0748 714/38.11 |
| 2007/0011486 | A1* | 1/2007 | Li | G06F 9/45533 714/5.11 |
| 2007/0011494 | A1* | 1/2007 | Xie | G06F 8/41 714/38.14 |
| 2007/0294651 | A1* | 12/2007 | Tsai | G06F 17/5022 716/102 |
| 2008/0059730 | A1* | 3/2008 | Cepulis | G06F 11/1433 711/161 |
| 2008/0066030 | A1* | 3/2008 | Hekmatpour | G06F 17/5022 716/102 |
| 2008/0098366 | A1* | 4/2008 | Fong | G06F 17/505 717/135 |
| 2008/0209160 | A1* | 8/2008 | Katz | G06F 11/263 711/206 |
| 2009/0049292 | A1* | 2/2009 | Lee | G06F 9/4411 713/2 |
| 2009/0172529 | A1* | 7/2009 | Jas | G06F 11/261 715/700 |
| 2009/0204931 | A1* | 8/2009 | Lim | G06F 17/5027 716/106 |
| 2010/0318961 | A1* | 12/2010 | Khoruzhenko | G06F 9/4411 717/107 |
| 2010/0325262 | A1* | 12/2010 | Allen | H04L 69/32 709/224 |
| 2011/0258596 | A1* | 10/2011 | Bykov | G06F 8/38 717/107 |
| 2011/0289507 | A1 | 11/2011 | Khan et al. | |
| 2011/0307878 | A1* | 12/2011 | Brannock | G06F 8/665 717/169 |
| 2012/0110378 | A1* | 5/2012 | Fan | G06F 11/1666 714/15 |
| 2012/0254831 | A1* | 10/2012 | Mortensen | G06F 9/4401 717/107 |
| 2012/0278791 | A1* | 11/2012 | Geist | G06F 11/3692 717/125 |
| 2012/0324417 | A1* | 12/2012 | Somani | G06F 8/30 717/101 |
| 2013/0014274 | A1* | 1/2013 | Goodes | G06F 21/6209 726/26 |
| 2013/0073909 | A1* | 3/2013 | Baudel | G06F 9/44521 714/38.1 |
| 2013/0138701 | A1* | 5/2013 | Jin | G06F 17/30734 707/803 |
| 2014/0049551 | A1* | 2/2014 | Rao | G06T 11/60 345/543 |
| 2014/0165208 | A1* | 6/2014 | Chevallier-Mames | G06F 21/14 726/26 |
| 2014/0180961 | A1* | 6/2014 | Hankins | G06Q 10/10 705/348 |
| 2014/0208431 | A1* | 7/2014 | Archer | G06F 21/577 726/25 |
| 2014/0258986 | A1* | 9/2014 | Wang | G06F 11/3684 717/126 |
| 2015/0082263 | A1* | 3/2015 | Vasudevan | G06F 17/504 716/106 |
| 2016/0154657 | A1* | 6/2016 | Lee | G06F 8/54 717/164 |

OTHER PUBLICATIONS

HP, "HP Smart Update Manager User Guide", Sep. 2011, HP, Edition: 5.*
MSDN, "How to: Edit a Build Definition", Visual Studio 2008, Microsoft.*
Glue-Library, "EDK II Glue Library Programming Guide", Intel, Jun. 2008, Rev 0.9.*
INF—Spec, "EDK II INF File Specification", May 2010, Intel Corporation, Rev 1.22,.*
Prucell, "Translation of DLL connects instruments to VISA", 2011, located at http://m.eet.com/media/1166409/25803-translation_dll_connects_instruments_to_visa.pdf.*
EDK; EDK II Module Information (INF) File Specification; http://ftp.jaist.ac.jp/pub/sourceforge/e/ed/edk2/Specifications/INF_Spec_v1.22_Errata_B.pdf>; Jun. 2012.
Calin Glitia; Progressive and Explicit Refinement of Scheduling for Multidimentional Data-flow Applications Using UML Marte; http://www.sop.inna.fr/members/Jean-Vivien.Millo/papiers/GDM-MBG2012.pdf > on pp. 137-169; vol. 16; Issue: 2; Jun. 1, 2012.
PCT/ISA/KR, International Search Report, dated Dec. 2, 2013, PCT/US2013/033656.

* cited by examiner

EXTENSIBLE FIRMWARE ABSTRACTION

BACKGROUND

Firmware includes machine readable instructions that interface directly with the computing hardware. During boot up, the firmware is typically read from a nonvolatile memory source. The firmware sets up the hardware and a firmware interface so that control of the system can be passed to the operating system. At runtime, when the operating system is in control of the computer, the firmware provides additional services to the operating system.

Firmware may be divided into a series of modules. These modules may be helpful for developing firmware because the modules encapsulate sets of instructions to perform more complex tasks. These modules may be used across diverse computing platforms to reduce development time and effort. However, the various computing platforms may need to execute the modules in a specific order or after completion of other modules or executables. Additionally, the computing platforms may use different addressing techniques that need to be accommodated by the firmware. To accommodate these different platform dependencies, a firmware developer may customize one or more of the modules for each of the different computing platforms. However, this customization can be undesirable for several reasons. Creating multiple versions of the firmware modules is expensive and the new firmware modules have a much greater chance of containing an error or creating conflicts with the hardware or other modules. Additionally, updating the multiple versions of the firmware modules can be laborious and may create additional errors. It is desirable to abstract the execution and/or function of a firmware module without altering source code in the shared module itself.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
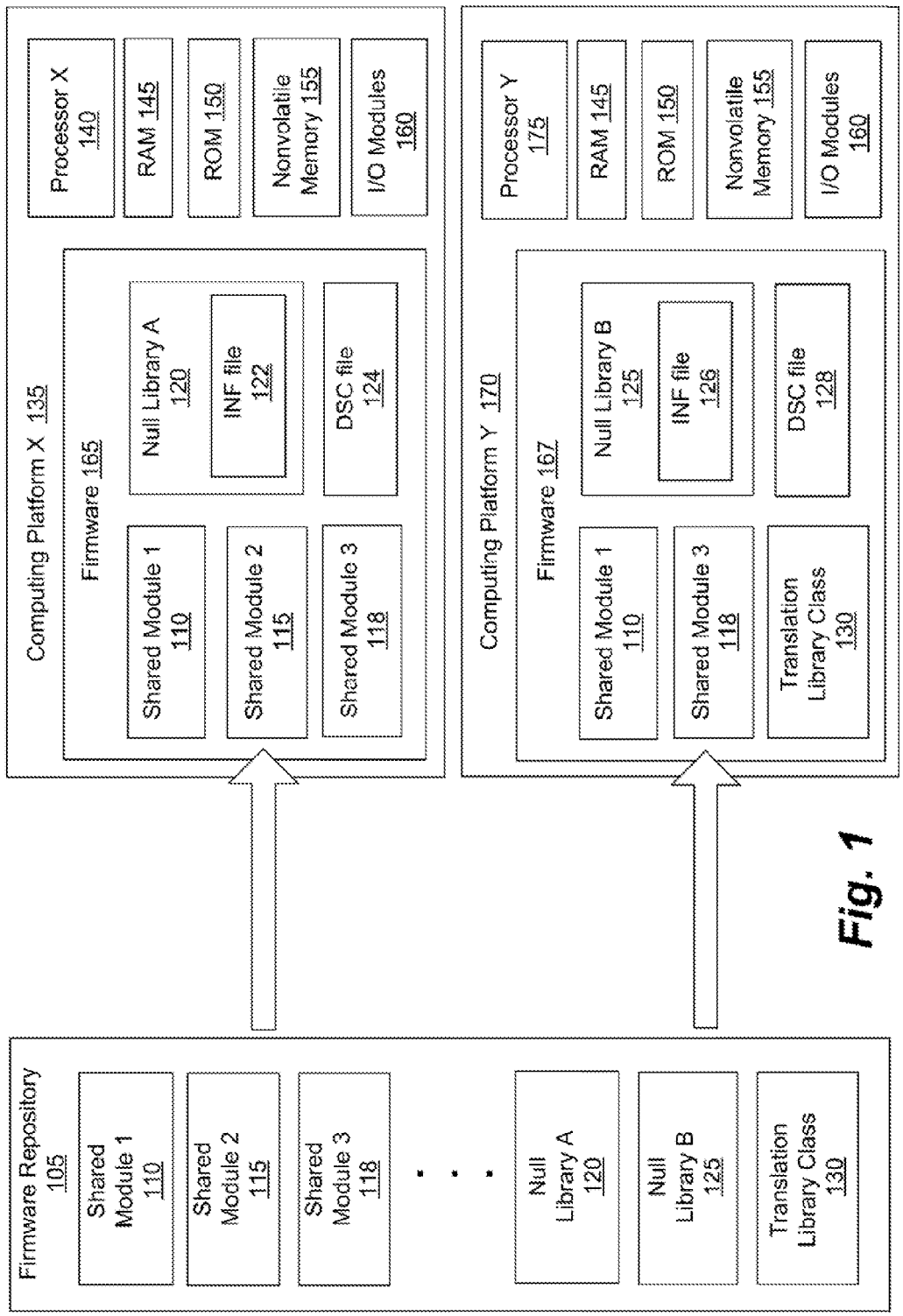
FIG. 1 is a diagram of a firmware repository that contains modules for use in firmware and the use of those modules in creating firmware for different computing platforms, according to one example of principles described herein.

Computing platform software is a set of machine readable instructions that directs the computing system to perform specific functions. Platform software includes firmware, device drivers and an operating system. The platform software acts as an intermediary between hardware that makes up the computing system and applications that are running on the computing system. Firmware includes machine readable instructions that are stored in nonvolatile memory such as ROM, EPROM, or flash memory. The firmware directly interfaces with hardware in the computing system. The operating system operates a higher level to provide common services for applications running on the computing system. Examples of operating systems include Mac OS X, Windows 8, Linux, iOS, Android, and HP-UX. Many modern computing systems also include an interface between the firmware and operating system layers. This interface is often defined by a specification called the Unified Extensible Firmware Interface (UEFI).

The UEFI defines services that the firmware interface should provide. These services are defined under two main classes: boot services and runtime services. At boot time the firmware has control of the computer system and sets up the hardware and firmware interface so that control of the system can be passed to the operating system. At runtime, when the operating system is in control of the computer, the firmware provides additional services to the operating system.

To prepare the computer system to run the operating system, the firmware executes a series of instruction modules. These modules may be helpful for developing firmware because they encapsulate sets of instructions to perform more complex tasks. Ideally, these modules could be written and used for one platform and then reused in a different platform to perform a similar task. This modularity could significantly decrease the amount of time and money required to develop firmware for new computing platforms. The developers could simply select the modules needed and use them as building blocks for the new platform. These preexisting modules ("reference code") have a number of advantages, including time tested stability and compatibility. However, in practice, minor differences between platforms and operating systems can require that the various modules be rewritten/modified.

If a developer changes the reference code he or she is using, the changes may cause a variety of problems in the development process. To make a change to the reference code requires the developer to have a good understanding of how the functions in the reference code operate and the effects of modifying these functions. Gaining this understanding may be time consuming for the developer. Also, the developer may misunderstand the proper way to change the code and end up introducing errors. A change to one portion of the reference code may lead to a need to change other parts as well; these changes may trigger the need for yet more changes, and so on.

These problems are compounded when more than one platform shares the reference code. A change to fix an issue in one platform may cause an error to occur for another platform. This may lead developers to create separate sets of sources for different platforms. If this occurs, the developers will produce several sources that are almost exactly the same, except for a few minor differences. This makes maintaining the code more difficult and costly. For example, a change may need to be made to portion of the code that is common to the several sources. Instead of simply changing one file, the developer has to find all the similar sources and make the change in each file. Each of these files will then need to be tested individually.

Original developers of the reference code may release an updated version of their firmware. If firmware developers have changed the reference code they use and want to incorporate the updated version, (this may include desirable performance improvements and error corrections) then they will have to go through a difficult and time consuming merge process where the developers examine all the updated code and their own changes to make sure there are no conflicts or errors introduced by the merge. This may increase the cost of merging updates to a point that developers will be discouraged from doing so.

The principles described below relate to systems and methods for sharing a firmware module(s) between platforms with different execution dependencies or different runtime constraints. As discussed above, it can be desirable to share common firmware modules across multiple computing platforms. However, some platforms may need to impose additional execution dependency conditions on some modules. For example, these additional execution dependency conditions may include other code or events that must be executed prior to the execution of the firmware module. Typically, these dependencies would be included using EDK II depex expressions. These depex expressions modify the firmware modules by defining conditions for executing or dispatching an entry point.

It can be problematic to modify a shared module directly to add platform-specific dependencies because this change could impact other platforms that use the shared module. However, the principles described below allow for a dependency to be added to the module without direct modification of the module itself. A separate library or library class is created that accommodates the peculiarities of a specific computing platform. This separate library or library class includes the needed execution dependencies for a computing platform and/or method/protocols compatible with the platform specific runtime constraints. For example, a null library with execution dependencies that are need for a shared firmware module can be created for a specific computing platform. In the platform specific DSC file, the shared firmware module is associated with the null library created for that platform. The needed dependencies and/or runtime constraints for the shared firmware module are inherited from the null library. This allows the platform specific dependencies to be added without modifying the shared module.

Firmware modules may define a hardware interface that is utilized by the operating system to access the hardware, including memory and registers. However, different hardware platforms may be configured to use different addressing schemes. The shared firmware modules may need to be modified/customized for these different processor architectures As discussed above, this can be time consuming and risky. The principles described below teach principles that can be used to accommodate different addressing schemes without requiring changes to the firmware modules. These modifications to the firmware allow for greater abstraction of shared firmware modules between different processor architectures. This results in more rapid creation, easier maintenance and increased reliability of firmware for the different processor architectures.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

FIG. 1 shows a firmware repository (105) that contains various firmware modules (110, 115, 118, 120, 125, 130). Some of these modules (110, 115, 118) are applicable to multiple computing platforms and are labeled "shared modules." However, as discussed above, differences between the computing platforms do not allow the shared modules to be completely compatible with all of the computing platforms. In this implementation, instead of directly modifying the shared modules for each platform, a number of platform specific modules (120, 125, 130) are created. These platform specific modules allow the shared modules to be used without modification. This maintains the modularity and reliability of the shared modules. In this example, the platform specific modules include "Null Library A" (120), "Null Library B" (125) and a "Translation Library Class" (130).

FIG. 1 also shows examples of firmware implementations on two different computing platforms (135,170). Computing platform X (135) includes a processor X (140), Random Access Memory (RAM) (145), Read Only Memory (ROM) (150), nonvolatile memory (155) and various I/O modules (160). The firmware (165) for the computing platform X includes shared module 1 (110), shared module 2 (115), shared module 3 (118), a null library A (120), an INF file (122) that is internal to the null library A, and a DSC file (124). The components shown for computing platform X are only examples. There may be a number of additional components, including additional hardware components (such as multiple processors), additional components in the firmware, and additional software components (such as an operating system). A DSC file is a plain text file used by the firmware to store description information, such a listing of firmware modules, associations between firmware modules, and other parameters. An INF file (also known as a "Setup Information File" or "Build File") specifies the source files to be built for a module, the dependencies for the module and other information about the module. The INF file contains various sections with each of the sections containing one or more line items. For example, a [DEPEX] section of the INF file may list the order in which the various listed files are to be executed and dependency relationships. In this example, the term "dependency" refers to any of a number of events that need to occur prior to the execution of one of the shared modules. Thus, a specific shared module should not be executed before the successful performance of these events.

In one example, computing platform X (135) may be an x86 platform and the processor X may be an x86 processor(s). This x86 platform uses hardware based on the Intel 8086 CPU and includes a specific instruction set. In this example, the x86 hardware requires specific dependencies that are not inherently present in shared firmware modules 1, 2, and 3. In one simple example, in order for module 1 to execute, it must first wait until the module 3 is executed. Some time later module 2 tries to execute but cannot because the module 1 is still waiting on the module 3 to finish. The early execution of module 2 can results in errors in the firmware execution. Module 2 lacks a dependency based on the completion of module 1.

As explained below, these additional dependencies can be supplied by the null library A (120) and listed in the INF file (122) and DSC file (124). The inclusion of the null library A (120) and modifications to the INF and DSC files (122, 124) allow for the appropriate dependency to be included without any modifications to the shared modules. This preserves the modularity of the shared files.

Computing platform Y (170) includes a processor Y (175), RAM (145), ROM (150), nonvolatile memory (155) and various I/O modules (160). The firmware (167) for the computing platform Y includes shared module 1 (110), shared module 3 (118), translation library class (130), a null library B (125), an INF file (126), and a DSC file (128). The components shown for computing platform Y are only examples. A variety of additional or alternative components may be present. In this example, computing platform Y (170) may be a Hewlett-Packard UniX (HP-UX®) platform and the processor Y (175) may be an Itanium® processor. The HP-UX platform may include a number of dependencies during the boot phase. As discussed below, these dependencies may be accommodated by inclusion of the appropriate null library(s) (125) and modifications to the INF and DSC files (126, 128) to allow for the appropriate dependency to be included without any modifications to the shared modules. This preserves the modularity of the shared files. Additionally, platform Y (170) may use a different addressing scheme during run time than is typically accommodated by the shared firmware modules (110, 118). As discussed below, this difference in addressing can be addressed by the inclusion of a translation library class (130).

Figure 2A:
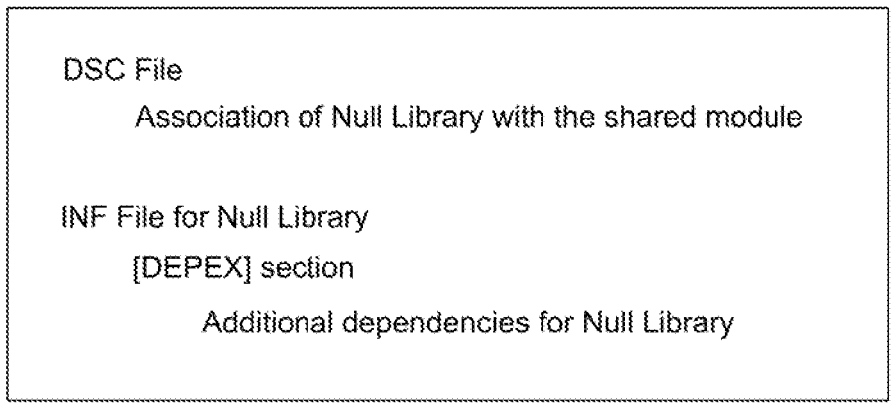
FIG. 2A is a diagram of various files and entries used to create additional dependencies with a null library for execution of firmware on a specific platform, according to one example of principles described herein.
Figure 2B:
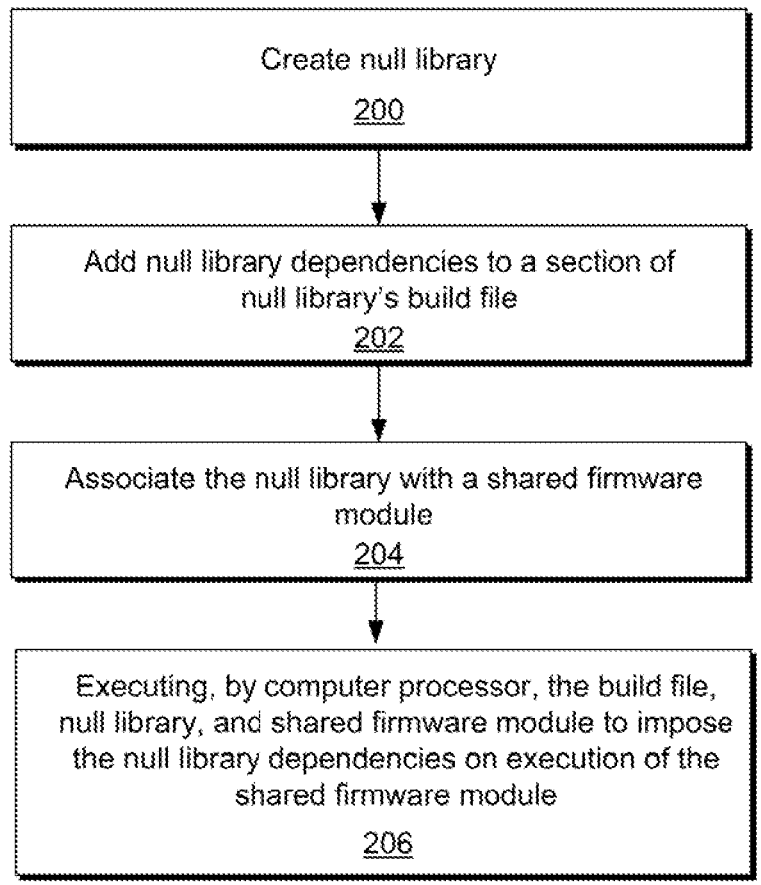
FIG. 2B is a flowchart for creating an extensible firmware interface abstraction, according to one example of principles described herein.

FIGS. 2A and 2B show one example of principles that can be used to accommodate different platform dependencies without modification of the shared firmware modules. FIG. 2A is a diagram of one implementation for defining dependencies with a null library and associating the null library with a shared firmware module. FIG. 2B is a flow chart of one example of method for accommodating different platform dependencies without modification of the shared firmware modules. In one example, a firmware developer uses EDK II (a UEFI development environment) to assign shared module dependencies for a certain platform without modifying the shared module itself. The additional dependencies for executing the shared firmware on a new hardware platform that are not currently present in the software can be determined or may be already known.

To accommodate the additional platform dependencies, a null library is created (block 200). For example, the null library may be a null EDK II library. The null library is not named and has no executable source code other than a dummy entry point function.

The dependencies for the null library are added to the null library's build file (block 202). In one implementation, the build file is an INF file and the additional dependencies for the null EDK II library are added to the [DEPEX](dependency expression) section of the INF file. These additional dependencies are added to accommodate specific platform characteristics of the computing platform that uses the shared module.

The null library is associated with a shared firmware module that depends on the null library dependencies for successful execution (block 204). This association can be accomplished by creating an association between the shared firmware module and the null library in a platform specific DSC file. This allows the association to be formed without modifying the shared module. An example of code related to a null library in a DSC file is given below.

Example [Components.X64]

---

MdeModulePkg/Core/Dxe/DxeMain.inf {
 <LibraryClasses>
 NULL|MdeModulePkg/Library/DxeCrc32GuidedSectionExtractLib
  /DxeCrc32GuidedSectionExtractLib.inf
 # Rigel
 NULL|HpServiceProcessorPkg/Library/CfwEfiLoadedLib
  /CfwEfiLoadedLib.inf

---

In some implementations, the null library can only be specified as part of a DSC override for a given module. Additionally there may be a requirement for the null library to be associated with a specific component. This may prevent the null library from being used as a common library class.

The association between the null library and shared module cause the module to inherit/incorporate the DEPEX properties from the null library without modification of the shared module. This method allows firmware developers to use shared modules for multiple platforms, while allowing each shared module to retain its own set of dependencies. It does this without the use of preprocessor directives or other conditional code that makes the reference code difficult to maintain. The build file, null library, and shared firmware module are executed by a computer processor on the computing platform to impose the null library dependencies on the execution of the firmware module (block 206). The null library dependencies are typically executed prior to executing the shared firmware module that depends on the null library dependencies.

Figure 3:
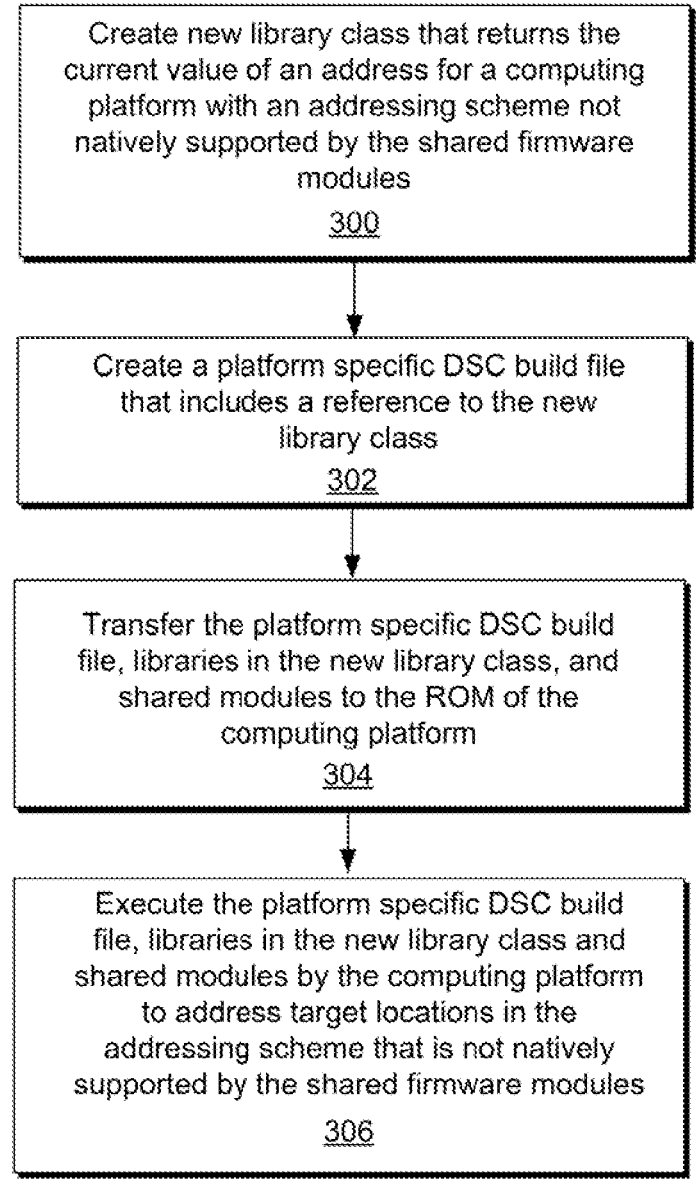
FIG. 3 is a flowchart of a method for creating a firmware addressing abstraction, according to one example of principles described herein.

FIG. 3 is a flowchart showing one method for accommodating different addressing systems in firmware while sharing firmware modules. As discussed above, different computing platforms may use different addressing systems. For example, in an x86 computing platform, the addressing during boot is a physical addressing mode and the addressing during runtime is a virtual addressing mode. One or more of the firmware modules is used to translate a virtual address received from the operating system during run time to a physical address so that the firmware can issue the correct Instructions to the hardware to read/write the target data. In contrast, the Itanium computing platform allows for both the physical addressing mode and virtual addressing mode to be used by the operating system during run time.

For example, to execute runtime services, the UEFI needs access to appropriate memory addresses. Memory addresses are stored in data types called pointers. For example, if the operating system sends a request to the UEFI to set the time on the real-time clock, the UEFI needs to have access to a pointer to the real-time clock in order to send commands. Issues arise, however, when support for runtime services for different CPU architectures are considered. As discussed above, different processors may utilize different sets of addressing modes. In the case of both x86 and Itanium architectures the firmware uses the physical addressing mode and then when the UEFI passes control to the operating system physical address pointers are converted to the equivalent virtual address pointers. The System Abstraction Layer (SAL) specification, however, requires support for Itanium systems to use both physical and virtual address pointers for runtime services. The UEFI for Itanium systems must maintain a set of the original physical address pointers in addition to the equivalent virtual address pointers.

Current industry practice dictates that two sets of libraries and/or modules are defined to handle this discrepancy. The result is that large portions of source code are duplicated to support a small difference in functionality. Further, if future architectures support additional addressing modes, even more source code would need to be duplicated, thus compounding the costs and maintenance associated with maintaining several sets of code, as described above. It would be desirable to isolate address handling in runtime services source code.

In one example, the virtual address handling in the runtime services source code can be isolated by creating a new EDK II library class (block 300) that returns the current value of the address. The address is received from the operating system, but the shared firmware modules do not natively support the addressing scheme used by the operating system/computing platform. For example, the shared firmware modules may expect to receive virtual addresses, but the operating system supplies (in some instances) hardware addresses. The entry point function of the library installs UEFI event handlers to adjust/translate the address during boot (for example, when the operating system executes "SetVirtualAddressMap").

When adding a new processor architecture, the new library classes and associated libraries for the new processor architecture are implemented. The platform DSC build file, which includes a reference to the new library class, is created (block 302). The platform DSC build file and libraries in the new library class, together with any other shared firmware modules, are transferred to the ROM of the computing platform (block 304). The platform specific DSC build file, new library class, and shared modules are executed by the computing platform to correctly address target locations in the addressing scheme that is not natively supported by the shared firmware modules (block 306). This allows the firmware to accommodate additional processor architectures, avoid impact to existing platforms, and minimizes the risk/effort in adding new processor architectures.

By using libraries to handle differences of between address modes used by a particular processor architecture during runtime services, more source code may be shared so that maintaining multiple sets of source code may be avoided. Additional architectures can be supported while avoiding impacts to existing platforms. This also helps minimize the work needed to support additional architectures.

The principles described above relate to methods that can be applied to firmware modules and source trees to improve the abstraction of different types of platforms. For example, a null library allows each platform to add additional dependencies to share a module (delay its execution) while avoiding platform specific modifications to the shared module. Other principles include improving runtime virtual address translation support across multiple process architectures. For example, these principles could be applied to general EDK II source trees.

The principles described herein may be embodied as a system, method or computer program product. The principles may take the form of an entirely hardware implementation, an implementation combining software and hardware aspects, or an implementation that includes a computer program product that includes one or more computer readable storage medium(s) having computer readable program code embodied thereon. Examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for extensible firmware abstraction comprising:
   creating a null library with a build file;
   adding null library dependencies to the null library's build file;
   associating the null library with a shared firmware module that depends on the null library dependencies for successful execution; and
   executing, by a computer processor, the build file, the null library, and the shared firmware module to impose the null library dependencies on execution of the shared firmware module.

2. The method of claim 1, in which the null library is not named and has no executable source code other than a dummy entry point function.

3. The method of claim 1, in which the null library is an EDK II library.

4. The method of claim 1, in which adding the null library dependencies to a section of the null library's build file comprises adding the null library dependencies to a dependency section of an INF build file.

5. The method of claim 1, further comprising, prior to creating the null library, determining additional dependencies for executing the shared firmware module on a new hardware platform that are not currently present in firmware.

6. The method of claim 1, in which associating the null library with a shared firmware module comprises associating the null library with the shared firmware module by editing an existing DSC build file.

7. The method of claim 1, in which executing the build file, null library, and shared firmware module comprise executing the null library dependencies prior to executing the shared firmware module that depends on the null library dependencies.

8. The method of claim 1, further comprising:
   creating a new library class that returns a current value of an address for a computing platform with an addressing scheme not natively supported by shared firmware modules;
   create a platform specific DSC build file that includes reference to the new library class;
   transferring the platform specific DSC build file, libraries in the new library class and the shared firmware modules to ROM of the computing platform; and
   executing, by the computer processor in the computing platform, the platform specific DSC build file, libraries within the new library class, and shared modules to address target locations identified by the addressing scheme.

9. The method of claim 1, wherein adding null library dependencies to the null library's build file comprises adding the dependencies to a dependency expression section of the build file.

10. A method for extensible firmware abstraction comprising:
    creating a new library class that returns the current value of an address for a computing platform with an addressing scheme not natively supported by shared firmware modules;
    create a platform specific DSC build file that includes reference to the new library class;
    transferring the platform specific DSC build file, libraries in the new library class and shared firmware modules to ROM of the computing platform; and
    executing, by a processor in the computing platform, the platform specific DSC build file, libraries within the new library class, and shared modules to address target locations in the addressing scheme that is not natively supported by the shared firmware modules.

11. The method of claim 10, in which the addressing scheme that is not natively supported by the shared firmware modules comprises runtime virtual mode addressing.

12. A computing platform comprising:
a processor;
nonvolatile memory accessible to the processor;
firmware comprising machine readable instructions stored in the nonvolatile memory, the machine readable instructions for execution by the processor, the machine readable instructions comprising:
shared modules with an incomplete set of execution dependencies or incomplete addressing scheme for successful execution by the computing platform; and
platform specific library modules that supply additional dependencies using at least one null library or an additional addressing scheme for successful execution by the shared modules without modification of the shared modifies by using at least one translation library class to translate an address to native computing platform.

13. The computing platform of claim 12, in which the platform specific library modules comprise a null library with no executable source code other than a dummy entry point function.

14. The computing platform of claim 13, in which the firmware further comprises an INF build file for the null library with a dependency section, wherein the dependency section comprises an additional dependency.

15. The computing platform of claim 14, in which the firmware further comprises a DSC file associating the null library with a shared module such that the shared module inherits the additional dependency from the null library.

16. The computing platform of claim 12, in which the platform specific library modules comprise a translation library class to return a current value of an address for the computing platform with an addressing scheme not natively supported by shared firmware modules.

17. The computing platform of claim 12, wherein the platform specific library modules comprise a null library.

* * * * *